Patented Aug. 26, 1952

2,608,484

UNITED STATES PATENT OFFICE 2,608,484

PROCESS FOR PREPARING ALCOHOLIC BEVERAGES

Jacob G. Bruinier, Zaandam, Netherlands

No Drawing. Application October 28, 1948, Serial No. 57,117. In the Netherlands November 6, 1947

1 Claim. (Cl. 99—35)

Fruit wines prepared from the fermented must or juice of fruit other than grapes, more particularly apples, pears and berries, are long since known. These beverages have a peculiar taste, depending on the kinds of fruit used as raw material and differing essentially from the taste of real wines from grapes, so that they cannot pass for wine.

Attempts have also been made already to prepare alcoholic beverages, the taste and other properties of which correspond to those of real wine to such an extent that they can serve as a substitute for wine.

Thus it has already been proposed to prepare artificial wine by adding to the starting materials usually found in an artificial wine mash, such as sugar, organic acids, e. g. tartaric acid or citric acid, tannin or gallic acid, and mineral substances, e. g. alkali bisulphites and phosphates, various taste and flavour imparting substances for the development of the bouquet. In this connection one always thought of additives having a strongly pronounced taste and flavour of their own, which were added in amounts relatively small in proportion to the amount of fermentable ingredients. It has also been proposed to add peas or other pulse for the development of the bouquet; these are seeds containing a high percentage of fermentable substances but only a slight amount of extractable constituents which are of importance to the taste and the flavour of the alcoholic beverage to be prepared.

It has now been found that excellent alcoholic beverages, particularly of the nature of wine, can be prepared in a particularly favourable and advantageous manner by employing juices or aqueous extracts, not from the fruit, grains or seeds, but from other plant parts, such as foliage, leaves, stems, more particularly graminaceous grasses, in the fresh condition of the growing plants or in dried condition (hay, straw). These plant parts do not contain in themselves such amounts of sugars or similar substances capable of yielding alcohol that in practice they come into consideration for the production of alcohol.

The process according to the invention substantially resides in that from the vegetable material used a juice or extract is recovered, which is mixed with fermentable sugars, if desired with addition of small amounts of aromatic plant parts or extracts thereof and/or other plant juices and/or fruit, fruit juices, or pulps, as well as of organic acids, such as tartaric or citric acid, and/or other substances promoting the fermentation, which mixture—if necessary diluted with water—is subjected to an alcoholic fermentation.

The said juices or extracts may be produced in various ways, such as by squeezing under high pressure or crushing between rollers, boiling out, macerating, digesting, percolating, infusing, continuously extracting and the like treatments which in the art are known for analogous purposes.

The proportion of sugar in the mixture and the fermenting process are adjusted in dependence on the alcoholic content desired in the product, which alcoholic content may be of the same order as the alcoholic contents usually found in ordinary wines.

In general the amounts of vegetable extract used are relatively large in proportion to the amount of fermentable sugars, so that they will give the prepared beverage a considerable content of organic and mineral substances. The species and kind of the plants and plant parts that are used, if desired in combination with a small addition of aromatic plants, is chosen with a view to the taste desired. Thus it is possible by a suitable selection of the vegetable starting material to prepare beverages, the taste of which will bear comparison with that of the finest qualities of various wines. Particularly suitable extracts can be obtained by decocting ordinary grass (or hay) and/or clover, and adding a rather small amount of aromatic plants which are chosen in connection with the particular taste, flavour and bouquet of the wine to be imitated. As mentioned above fruit, fruit pulp, juice or must may also be added, which participate in the fermentation.

After the fermenting process the alcoholic liquid is further treated in the known manner, filtered, clarified and balanced in taste.

The process can also be carried out in such a manner that alcoholic beverages other than those resembling wine are obtained. The product of the process may also be mixed with beverages prepared in another way, e. g. with wine or fruit wine; it may also serve for improving badly tasting real wine, for example, in years of a poor vintage. The latter treatment can be effected by adding the concentrated juices referred to above, in such amounts that the extract content of the grape must is brought to the desired level, of a good vintage year, whereupon acids and sugar may still be added, if necessary, to balance the whole until the composition of a good must is obtained. This treatment can also be applied to all fruit and plant wines.

As appears from this specification, in contradistinction to the known processes, no grains or seeds are used in the process according to the invention, at least not in considerable amounts. The juices from the stalk of sugar cane, from the beetroot and from the crushed inflorescence of palms, from which on account of their high sugar content alcoholic beverages, e. g. cane-wine and palm-wine, were already prepared in earlier times, are also excluded from the present process. The other parts of these plants may be used, however.

The following illustrates by way of example a particular manner of carrying the invention into practice.

One part by weight of grass (or ¼ part of hay) is boiled with 4 to 5 parts of water, whereupon the liquid is poured through a sieve cloth or filter and the plant residue is squeezed out. Thus about 4½ parts of liquid, comprising the extract of the grass or hay, are collected.

The aqueous extract obtained above is added to a fermentable sugar and a fermentable fruit juice solution, such as one containing the juice of cherries, grapes, prunes, etc., along with the usual fermentation additives to obtain after fermentation, a wine of the usual alcoholic content and of improved flavor, uniformity and quality.

Then sugar is melted in said liquid in an amount corresponding with 270 grams of sugar per litre of solution. To this solution further addition is made of the juice of 50 to 100 grams of grapes, cherries, prunes or berries per litre. Moreover it may be advantageous to add some nutrient salts, e. g. 0.5 gram of a mixture of ammonium phosphate and ammonium sulphate. The mixture is put into a bottle or vessel and subjected to fermentation. Owing to the natural ferments contained in the grapes or other fruits, an alcoholic fermentation will soon start, however, if the said ferment is insufficient to bring the fermentaion to completion, yeast or a yeast culture may also be added. After some weeks the sugar contained in the solution is fermented, and the liquid is converted into an alcoholic beverage having the taste of wine and an alcoholic content of about 15%. If a lower alcohol content is wanted in the beverage, the amount of sugar may be reduced accordingly.

I claim:

A process for the preparation of wine of improved flavor, uniformity, and of good quality, comprising preparing a mixture of a fermentable sugar and a fermentation promoter in a fermentable fruit juice aqueous solution, the sugar content in said mixture adjusted for the alcoholic content in the wine as desired, adding to said mixture of fermentable sugar and fermentation promoter in said fruit juice an aqueous extract prepared from the stalks of graminaceous grasses, said extract prepared by boiling about 1 part by weight of the graminaceous grass to about 4 to 5 parts by weight of water and separated from the graminaceous grass residue, said aqueous grass being substantially free from fermentable substances yielding alcohol on fermentation, and thereafter fermenting the grass extract admixed with the fermentable sugar, fermentation promoter, and fruit juice to obtain a wine of the desired alcoholic content of improved flavor, greater uniformity, and of good quality.

JACOB G. BRUINIER.

REFERENCES CITED

The following references are of record in the file of this patent:

UNITED STATES PATENTS

| Number | Name | Date |
| --- | --- | --- |
| 183,840 | Decker | Oct. 31, 1876 |
| 2,243,513 | Takakishi | May 27, 1941 |

FOREIGN PATENTS

| Number | Country | Date |
| --- | --- | --- |
| 629 | Great Britain | 1748 |
| 18,524 | Great Britain | Nov. 18, 1899 |
| 4,251 | Great Britain | Feb. 17, 1900 |

OTHER REFERENCES

"Chemistry and Technology of Wines and Liquors," by Karl M. Herstein and Morris B. Jacobs, 2nd edition, published by D. Van Nostrand and Company, Inc., 1948, New York, New York, pages 217–226.